(12) United States Patent
Powers, III

(10) Patent No.: US 9,394,689 B2
(45) Date of Patent: Jul. 19, 2016

(54) TILTABLE BEAMS FOR FLAT ROOF SOLAR SENSOR STRUCTURES

(71) Applicant: John Powers, III, Pheonix, AZ (US)

(72) Inventor: John Powers, III, Pheonix, AZ (US)

( * ) Notice: Subject to any disclaimer, the term of this patent is extended or adjusted under 35 U.S.C. 154(b) by 0 days.

(21) Appl. No.: 14/481,373

(22) Filed: Sep. 9, 2014

(65) Prior Publication Data

US 2016/0069075 A1 Mar. 10, 2016

(51) Int. Cl.
| | |
|---|---|
| *E04D 13/18* | (2014.01) |
| *E04B 7/16* | (2006.01) |
| *E04B 7/02* | (2006.01) |
| *F24J 2/52* | (2006.01) |
| *H02S 20/30* | (2014.01) |
| *H02S 20/10* | (2014.01) |

(52) U.S. Cl.
CPC ............. *E04B 7/163* (2013.01); *E04B 7/022* (2013.01); *F24J 2/52* (2013.01); *H02S 20/10* (2014.12); *H02S 20/30* (2014.12)

(58) Field of Classification Search
CPC ......... F24J 2/5245; F24J 2/5264; F24J 2/523; F24J 2/541; F24J 2/5235; F24J 2002/5482; F24J 2/54; E04B 7/163; E04B 2001/2415; E04B 1/344; E04B 2001/2439; E04B 1/2403; E04B 2001/2418; E04H 6/025
See application file for complete search history.

(56) References Cited

U.S. PATENT DOCUMENTS

| | | | | | |
|---|---|---|---|---|---|
| 4,490,958 | A | * | 1/1985 | Lowe | 52/634 |
| 4,616,453 | A | * | 10/1986 | Sheppard et al. | 52/93.1 |
| 5,157,882 | A | * | 10/1992 | Soble | 52/298 |
| 6,138,427 | A | * | 10/2000 | Houghton | 52/655.1 |
| 7,798,461 | B2 | * | 9/2010 | Hackney | 248/371 |
| 8,052,100 | B2 | * | 11/2011 | Zante et al. | 248/122.1 |
| 8,544,221 | B2 | * | 10/2013 | Marley | 52/173.3 |
| 2009/0211177 | A1 | * | 8/2009 | Grafton et al. | 52/93.1 |
| 2009/0256046 | A1 | * | 10/2009 | Hausner et al. | 248/398 |
| 2012/0124922 | A1 | * | 5/2012 | Cusson et al. | 52/173.3 |
| 2013/0026308 | A1 | * | 1/2013 | Walquist et al. | 248/122.1 |
| 2013/0098858 | A1 | * | 4/2013 | Cusson et al. | 211/189 |
| 2014/0048124 | A1 | * | 2/2014 | Park et al. | 136/251 |

\* cited by examiner

*Primary Examiner* — Brian Mattei
*Assistant Examiner* — Gisele Ford
(74) *Attorney, Agent, or Firm* — Robert A. Parsons; Michael W. Goltry; Parsons & Goltry

(57) ABSTRACT

A tiltable flat roof structure includes vertical columns and horizontally oriented hollow beams. Each hollow beam has a downwardly facing opening in a mounting area with the upper end of a column positioned therein. Holes are defined in the upper end of each column oriented in a regular pattern. Arcuate slots are defined in the mounting area of each beam with each of the slots having a length equal to an amount of relative rotation between the beam and the column. The slots are oriented in a regular pattern matching the regular pattern of the mounting holes so that the holes are aligned with the slots throughout the amount of relative rotation. Nuts are affixed to the inner surface of each of the columns in alignment with each of the holes and bolts are inserted through the holes and matching slots to fixedly orient the beams relative to the columns.

19 Claims, 3 Drawing Sheets

US 9,394,689 B2

1

TILTABLE BEAMS FOR FLAT ROOF SOLAR SENSOR STRUCTURES

FIELD OF THE INVENTION

This invention generally relates to flat roof sections mounted on or forming the flat roof and more specifically to tiltable beams for use in flat roof structures.

BACKGROUND OF THE INVENTION

At the present time, metal flat roof structures and/or solar panel mounts include purlins in a generally C-shape or, in some instances, a box-shape for extra strength, attached to generally horizontal beams. The generally horizontal beams or rafters are attached to the upper ends of vertical columns having lower ends fixed in the ground. The purlins have an upper flat surface or form a channel to which the solar panels are attached or inserted. In many instances the clearance beneath the flat roof structure changes for different applications and the specific orientation of the solar panels on the flat roof may require some adjustment for maximum output, depending upon the specific geographical position.

The problem is that the flat roof structure is mounted by means of generally horizontal beams or rafters fixedly attached to the upper ends of columns having a lower end fixedly embedded in the ground, cement footings, etc. Generally the beams are attached to form a small angle (i.e. not horizontal with the mounting surface or ground) with the columns for multiple reasons including better direction of the solar panels toward the sun, water run-off, etc. In practice, the flat roof structure is specifically designed to be manufactured in a plant, carried to a site, and simply assembled at the site using ordinary tools, such as wrenches. Thus, any angular adjustment of the beams relative to the columns would have to be made in the plant before assembly. Clearly, such angular adjustments would require each flat roof structure to be fabricated for each specific location and would be cost prohibitive.

It would be highly advantageous, therefore, to remedy the foregoing and other deficiencies inherent in the prior art.

Accordingly, it is an object of the present invention to provide a new and improved adjustable or tiltable flat roof structure.

It is another object of the present invention to provide new and improved adjustable or tiltable beams for use in a flat roof structure.

It is another object of the present invention to provide new and improved adjustable or tiltable beams for use in a flat roof structure that can be prefabricated, assembled and adjusted at the site.

SUMMARY OF THE INVENTION

Briefly, to achieve the desired objects of the instant invention in accordance with a preferred embodiment thereof, a tiltable flat roof structure is provided including at least one vertical column with a lower end and an upper end and a substantially horizontally oriented hollow beam having a downwardly facing opening in a mounting area, the opening being designed to receive the upper end of the column therein. A plurality of mounting holes are defined in one of the upper end of the column and the mounting area of the beam, the mounting holes are oriented in a regular pattern. A plurality of mounting arcuate slots are defined in the other of the upper end of the column and the mounting area of the beam. Each of the arcuate slots has a length equal to an amount of relative rotation between the beam and the column and the mounting arcuate slots are oriented in a regular pattern matching the regular pattern of the mounting holes so that the plurality of holes are aligned with the plurality of slots throughout the amount of relative rotation. A plurality of bolts, one each, are inserted through the holes and matching slots and threadedly engaged with nuts to fixedly position the beam relative to the column.

The desired objects of the instant invention are further achieved in accordance with a method of fabricating a tiltable flat roof structure including the steps of providing at least one vertical column with a lower end and an upper end and a substantially horizontally oriented hollow beam having a downwardly facing opening in a mounting area, with the opening designed to receive the upper end of the column therein and the upper end of the column positioned in the opening in the beam. The method further includes a step of defining a plurality of mounting holes in the upper end of the column, the mounting holes being oriented in a regular pattern and a step of defining a plurality of mounting arcuate slots in the mounting area of the beam. Each of the arcuate slots has a length equal to an amount of relative rotation between the beam and the column and the mounting arcuate slots are oriented in a regular pattern matching the regular pattern of the mounting holes so that the plurality of holes are aligned with the plurality of slots throughout the amount of relative rotation. The method further includes the steps of affixing a plurality of nuts, one each to the inner surface of the column in alignment with each of the plurality of holes, positioning the upper end of the column in the opening in the beam with the slots and holes aligned, and providing a plurality of bolts, and inserting one each of the plurality of bolts through the holes and matching slots and threadedly engaging the nuts to fixedly position the beam relative to the column.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF A PREFERRED EMBODIMENT

Figure 1:
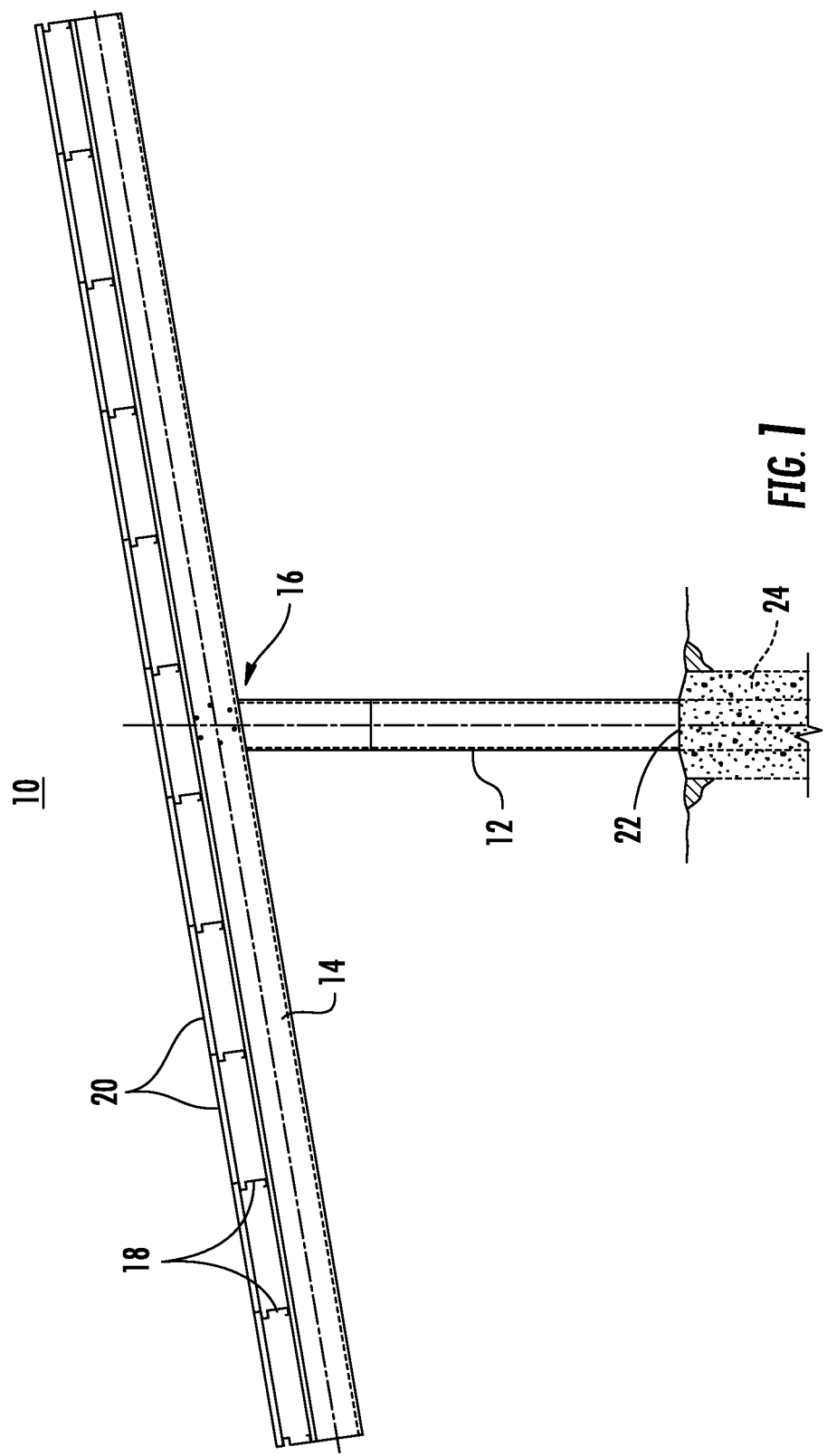
FIG. 1 is a side view of a flat roof structure of the type anticipated for the present invention.

Turning now to FIG. 1, a flat roof structure 10, in accordance with the present invention, is illustrated. Structure 10 includes a plurality of vertical columns or posts 12 (only one visible) each with a beam 14 attached to an upper end 16. A plurality of purlins 18 are affixed to an upper surface of beams 14 and positioned to extend longitudinally in parallel spaced apart relationship to substantially define the roof area. Some roofing material or flat sections 20 are attached to the upper surface of purlins 18 to form a complete roof. One example of roofing material or flat sections that can be used for sections 20 is provided in United States Patent entitled "Solar Support Structure", bearing U.S. Pat. No. 8,511,007 issued on Aug. 20, 2013 and incorporated herein by reference. Also, the attachment of the purlins to the cantilever beams is illustrated in detail in a United States Patent entitled "Flat Roof Support Structure", bearing U.S. Pat. No. 8,646,230, issued on Nov. 2, 2014, and incorporated herein by reference.

For purposes of this disclosure it should be understood that structure 10 is chiefly assembled at the site and it is highly desirable that each step of the assembly procedure be as simple as possible. Basically, each of the components mentioned above (i.e. column 12, beams 14, purlins 18, and roof sections 20) are provided as individual items from a factory/shop and assembled on site into structure 10. By providing the items separately each item can be relatively easily handled by workmen conveying the items to the site and by workmen doing the assembling at the site. At this point it is important to understand that no welding is performed at the site since that would require substantial additional equipment and electrical power, as well as government inspectors on site at substantial additional cost.

Briefly, the assembly procedure includes fixing a lower end 22 of each column 12 in the ground or in a base (e.g. a footing) 24 that serves as the ground. The midsection or mounting area of beam 14 is affixed to the upper end 16 of an associated column 12 by structure that will be explained in detail below. Beams 14 and the structure affixing them to ends 16 of columns 12 are pre-designed to provide an angular slope to the roof. The specific slope of beams 14, and therefore the flat roof, is an object of the present invention and is explained in detail below. With cantilever beams 14 fixedly attached, purlins 18 are attached to the upper surface of cantilever beams 14 in a direction perpendicular to cantilever beam 14. Roof sections 20 are then attached to purlins 18 in any well-known manner (see for example the structure disclosed in the above identified copending patent application) and using any well-known attachment devices such as screws, bolts, clamps, etc.

Figure 2:
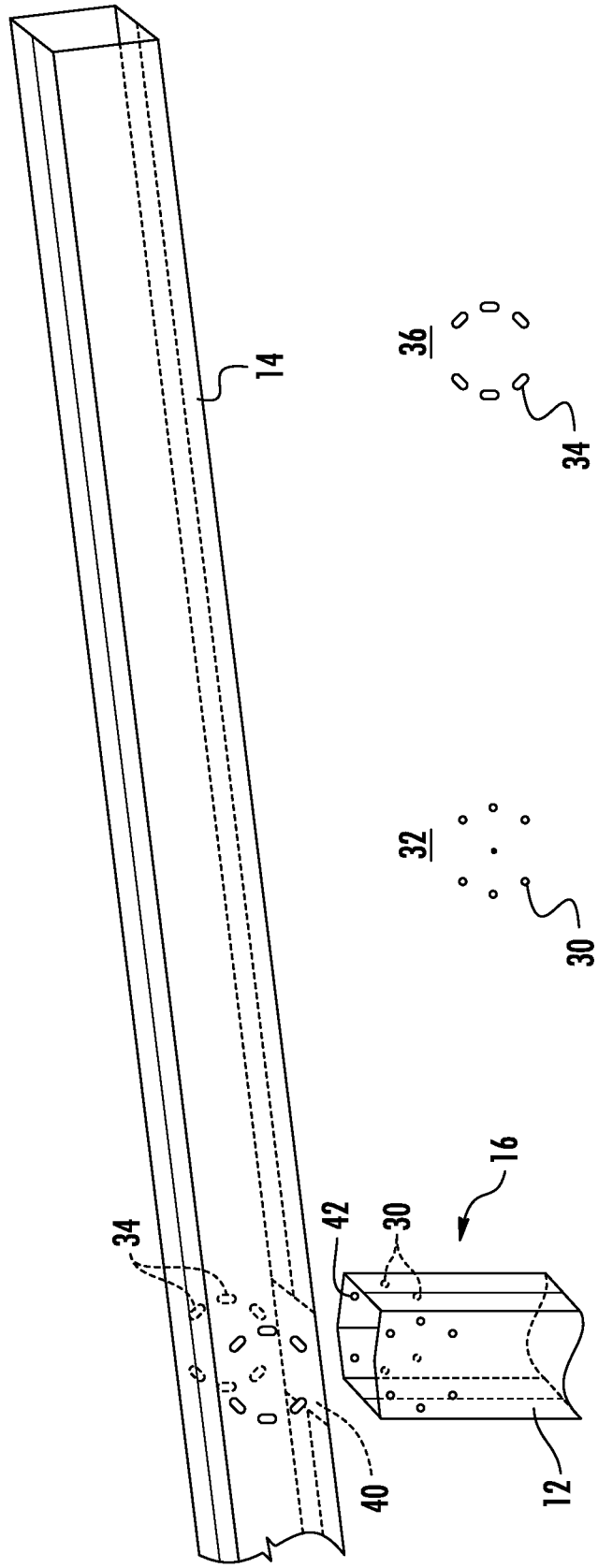
FIG. 2a is an isometric side view of a beam and column used in the flat roof structure of FIG. 1.
FIG. 2b illustrates the layout of mounting holes in the column.
FIG. 2c illustrates the layout of mounting slots in the beam.

Turning now to FIG. 2, a specific column 12 and beam 14, fabricated in accordance with the present invention, are illustrated. In this specific embodiment each column 12 and beam 14 is formed by affixing two elongated channels together in abutting relationship, for example by welding, bolting, etc. Each channel may be preformed in the factory/shop in a generally C-shaped configuration with a major wall, two side walls extending perpendicular to the major wall from opposite edges and flanges extending inwardly toward each other perpendicular to the side walls. As a typical example and for purposes of explanation, the channels forming each column 12 and beam 14 can be formed from a flat stock of 20 gauge steel. Each column 12 and beam 14 is formed by affixing two channels together by attaching the flanges of each channel in abutting relationship, for example by welding, bolting, etc. Column 12 and beam 14 each form a rectangular hollow box-like structure as illustrated in FIG. 2 a). While specific structures for the columns and beams are described in this example for purposes of a complete disclosure, it will be understood that other column and beam configurations can be devised and used in conjunction with the present tiltable beam invention.

As can be seen in FIGS. 2, a) and b), a plurality of mounting holes 30 are formed in each opposed side surface of column 12 adjacent the upper end. Holes 30 are formed in a circular pattern 32 best seen in FIG. 2 b). In this specific example, circular pattern 32 includes six holes positioned in a circle, spaced approximately 45 degrees apart with no holes positioned at the zero degree and 180 degree positions. Thus, the six holes are positioned at the 45°, 90°, 135°, 225°, 270°, and 315° positions on the circle. While the specific pattern illustrated is preferred for its strength and simplicity, more or less holes and in different patterns may be utilized.

Figure 3:
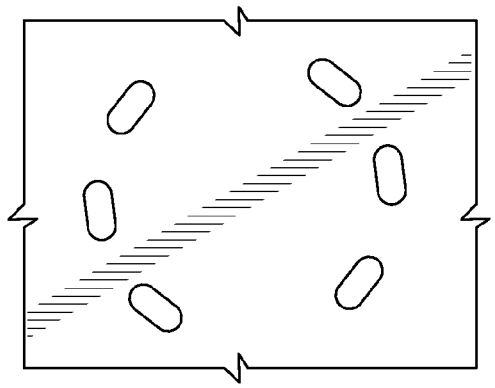
FIG. 3 is a pictorial side view of the actual slots in the beam for the present invention.
Figure 4:
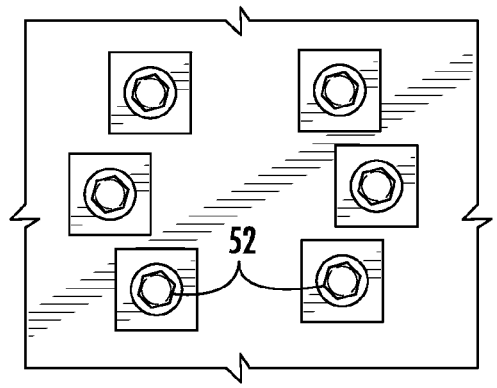
FIG. 4 is a pictorial side view of the actual mounting bolts assembled in the beam for the present invention.

Also, as can be seen in FIGS. 2, a) and c), a plurality of arcuate mounting slots 34 are formed in each opposed side surface at a midsection or mounting area of beam 14. Arcuate slots 34 are formed in a circular pattern 36 best seen in FIG. 2 c). In this specific example, pattern 36 includes six slots positioned in a circle, with the centers spaced approximately 45 degrees apart and no slots positioned at the zero degree and 180 degree positions. Thus, the six slots are positioned with the centers at the 45°, 90°, 135°, 225°, 270°, and 315° positions on the circle. As will be understood, holes 30 in column 12 are positioned to be aligned with the centers of slots 34 in beam 14 in the initial assembly. Also, in this specific example, slots 34 extend an arcuate distance sufficient to allow approximately 10 degrees of relative rotation between column 12 and beam 14 when assembled, as described in detail below. It will of course be understood that a greater or lesser amount of movement (e.g. 5° to 15°) could be incorporated in specific applications. It will be understood that the number and length of slots 34 must correspond with the number and position of holes 30 and are limited to not substantially affect the strength of beam 14. A pictorial view of slots 34 is shown in FIG. 3 and an assembled view of column 12 and beam 14 is illustrated pictorially in FIG. 4.

For purposes of assembly, an opening 40 is formed in the lower wall of beam 14 and the relative widths of column 12 and beam 14 are such that the upper end of column 12 slides easily into opening 40 of beam 14. Also, holes 30 and slots 34 are positioned with respect to the sides of column 12 and beam 14, respectively, so that relative rotary movement is possible between beam 12 and column 14. To this end, the upper most edge 42 of column 12 may be beveled or otherwise formed to allow the limited relative rotation. Also, a plurality of nuts 44 are spot welded to the inner surface of column 12 one each in alignment with holes 30 (see FIG. 6). Generally, nuts 44 are assembled to the column in the factory/shop so that no welding is performed at the assembly site and to greatly simplify assembly at the site. For instance, holes 30 and nuts 44 can be formed and affixed in the channel elements of column 12 before the channel elements are joined to form column 12.

Figure 5:
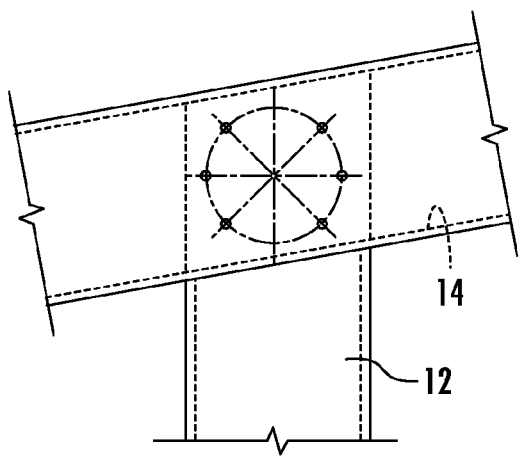
FIG. 5 is a side view illustrating a beam positioned on a column, in accordance with the present invention.
Figure 6:
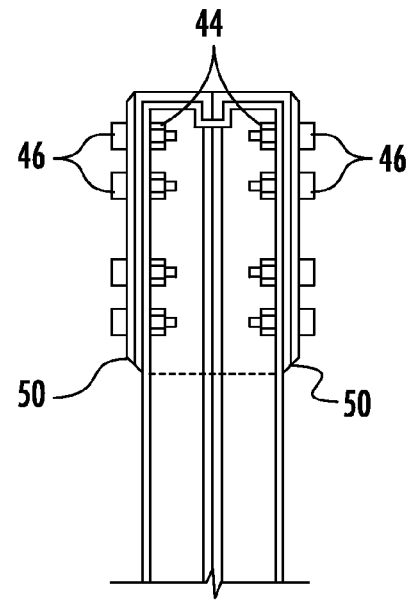
FIG. 6 is a sectional view through the beam and column of FIG. 5 illustrating the internal positions, in accordance with the present invention.

Referring to FIGS. 5 and 6, beam 14 assembled on the upper end 16 of column 12 is illustrated. As can be seen (with additional reference to FIG. 1) beam 14 is generally or initially angled, in this specific example, with respect to vertical column 12 at approximately 20°. The initial angle between beam 12 and column 14 may vary in accordance with the specific application and the geographical location. In the assembly procedure, beam 14 is positioned over the upper end of column 12 and moved so that slots 34 are aligned and approximately centered over holes 30. Bolts 46 are inserted through slots 34 and threadedly engaged in nuts 44 on the back of each hole 30. A single reinforcing plate 50 may be provided with holes patterned to match those in column 12 for each side of beam 12, as illustrated in FIG. 6. Instead of single plate 50, six reinforcing plate washers 52 (see FIG. 4) can be provided, one to be assembled under the head of each bolt 46.

In a typical application wherein roof section 20 include solar panels, bolts 46 are tightened sufficiently to hold beam 14 in an initial angular orientation. With the solar panels electrically connected, the entire roof is adjusted or rotated plus or minus 5 degrees to provide the best orientation relative to the sun (i.e. maximum solar panel output). Bolts 46 can then be tightened to firmly hold the roof structure in the desired orientation.

While in this preferred embodiment slots 34 are formed in the sides of beam 14 and match or are aligned with holes 30 in the sides of column 12, it should be understood that the slots and holes could be reversed, i.e. slots 34 in the upper end of column 12 and holes 30 in the midsection or mounting area of beam 14. In either structure the holes and slots match in both number and orientation to provide the desired limited relative rotation. Also, for additional holding or mounting strength, in the preferred embodiment holes 30 and slots 34 are formed on each side of column 12 and beam 14 but they could be formed on only one side, especially when the roof structure includes a plurality of columns and beams.

Thus, it will be understood that the new and improved tiltable beams for use in flat roof structures greatly simplifies the manufacturing of roof beams and column and allows adjustment of the orientation of the roof structure at any time after assembly. All of the components of the tiltable roof structure are standard manufactured items so that no special embodiment is required for any application or geographical location. The standard components can be used to quickly and easily affix roof beams to vertical columns at the site and do not require any on-site welding or any special tools.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A tiltable flat roof structure comprising:
   at least one vertical column with a lower end and an upper end and a substantially horizontally oriented hollow beam having a pair of spaced apart sidewalls, a bottom wall extending between the pair of spaced apart sidewalls, and a downwardly facing opening formed in the bottom wall, the opening being designed to receive the upper end of the column therein wherein the pair of spaced apart sidewalls are positionable adjacent walls of the column;
   a plurality of mounting holes defined in one of the walls of the upper end of the column and the pair of spaced apart sidewalls of the beam, the mounting holes being oriented in a regular pattern;
   a plurality of mounting arcuate slots defined in another of the walls of the upper end of the column and the pair of spaced apart sidewalls of the beam, each of the arcuate slots having a length or arc equal to a predetermined number of degrees of relative rotation between the beam and the column, the mounting arcuate slots being oriented in a regular pattern matching the regular pattern of the mounting holes so that the plurality of holes are aligned with the plurality of slots throughout the predetermined number of degrees of relative rotation; and
   a plurality of bolts, one each inserted through the holes and matching slots and threadedly engaged with nuts to fixedly position the beam relative to the column.

2. The tiltable flat roof structure as claimed in claim 1 wherein the arcuate slots each have a length sufficient to allow relative rotation between the column and the beam of between 5 degrees and 15 degrees.

3. The tiltable flat roof structure as claimed in claim 2 wherein the arcuate slots each have a length sufficient to allow relative rotation between the column and the beam of approximately 10 degrees.

4. The tiltable flat roof structure as claimed in claim 1 wherein the plurality of arcuate slots and the plurality of holes are each arranged in a circular pattern.

5. The tiltable flat roof structure as claimed in claim 4 wherein the plurality of arcuate slots and the plurality of holes are positioned within the circular pattern at 45°, 90°, 135°, 225°, 270°, and 315°.

6. The tiltable flat roof structure as claimed in claim 1 wherein the plurality of arcuate slots and the plurality of holes are defined on opposite sides of the upper end of the column in the walls and opposite sides of a mounting area of the beam in the pair of spaced apart sidewalls.

7. The tiltable flat roof structure as claimed in claim 1 further including a reinforcing plate positioned over the outer surface of the beam and including a plurality of holes defined therethrough one each in alignment with the plurality of holes in the upper end of the column.

8. The tiltable flat roof structure as claimed in claim 1 further including a plurality of reinforcing washers positioned over the outer surface of the beam, one each engaged with one of the plurality bolts.

9. A tiltable flat roof structure comprising:
   a plurality of vertical columns, each column having a lower end and an upper end, and a plurality of substantially horizontally oriented hollow beams, each hollow beam having a pair of spaced apart sidewalls, a bottom wall extending between the pair of spaced apart sidewalls, and a downwardly facing opening formed in the bottom wall with the opening being designed to receive the upper end of one associated column of the plurality of columns therein, the upper end of the associated column positioned in the opening in the beam wherein the pair of spaced apart sidewalls are positioned adjacent walls of the column;
   a plurality of mounting holes defined in the walls of the upper end of each of the plurality of columns, the mounting holes being oriented in a regular pattern;
   a plurality of mounting arcuate slots defined in the pair of spaced apart sidewalls of each of the plurality of beams, each of the arcuate slots having a length or arc equal to a predetermined number of degrees of relative rotation between the beam and the column, the mounting arcuate slots being oriented in a regular pattern matching the regular pattern of the mounting holes so that the plurality of holes are aligned with the plurality of slots throughout the predetermined number of degrees of relative rotation;
   a plurality of nuts, one each affixed to the inner surface of the walls of each of the columns of the plurality of columns in alignment with each of the plurality of holes; and
   a plurality of bolts, one each inserted through the holes and matching slots and threadedly engaged with the nuts to fixedly position each of the plurality of beams relative to the associated one of the plurality of columns.

10. The tiltable flat roof structure as claimed in claim 9 wherein the arcuate slots each have a length sufficient to allow relative rotation between the column and the beam of between 5 degrees and 15 degrees.

11. The tiltable flat roof structure as claimed in claim 10 wherein the arcuate slots each have a length sufficient to allow relative rotation between the column and the beam of approximately 10 degrees.

12. The tiltable flat roof structure as claimed in claim 9 wherein the plurality of arcuate slots and the plurality of holes are each arranged in a circular pattern.

13. The tiltable flat roof structure as claimed in claim 12 wherein the plurality of arcuate slots and the plurality of holes are positioned within the circular pattern at 45°, 90°, 135°, 225°, 270°, and 315°.

14. The tiltable flat roof structure as claimed in claim 9 wherein the plurality of holes and the plurality of arcuate slots are defined on opposite sides of the upper end of the column in the walls and opposite sides of a mounting area of the beam, in the pair of spaced apart sidewalls, respectively.

15. The tiltable flat roof structure as claimed in claim 9 further including a reinforcing plate positioned over the outer surface of the beam and including a plurality of holes defined therethrough one each in alignment with the plurality of holes in the upper end of the column.

16. The tiltable flat roof structure as claimed in claim 9 further including a plurality of reinforcing washers positioned over the outer surface of the beam, one each engaged with one of the plurality bolts.

17. A method of fabricating a tiltable flat roof structure comprising the steps of:
    providing at least one vertical column with a lower end and an upper end and a substantially horizontally oriented hollow beam having a pair of spaced apart sidewalls, a bottom wall extending between the pair of spaced apart sidewalls, and a downwardly facing opening formed in the bottom wall, the opening being designed to receive the upper end of the column therein and the upper end of the column positioned in the opening in the beam wherein the pair of spaced apart sidewalls are positionable adjacent walls of the column;
    defining a plurality of mounting holes in the walls of the upper end of the column, the mounting holes being oriented in a regular pattern;
    defining a plurality of mounting arcuate slots in the pair of spaced apart sidewalls of the beam, each of the arcuate slots having a length or arc equal to a predetermined number of degrees of relative rotation between the beam and the column, the mounting arcuate slots being oriented in a regular pattern matching the regular pattern of the mounting holes so that the plurality of holes are aligned with the plurality of slots throughout the predetermined number of degrees of relative rotation;
    affixing a plurality of nuts, one each to the inner surface of the walls of the column in alignment with each of the plurality of holes;
    positioning the upper end of the column in the opening in the beam with the slots and holes aligned; and
    providing a plurality of bolts, and inserting one each of the plurality of bolts through the holes and matching slots and threadedly engaging the nuts to fixedly position the beam relative to the column.

18. The method as claimed in claim 17 wherein the step of affixing the plurality of nuts includes spot welding each nut to the surface of the column.

19. The method as claimed in claim 17 wherein the step of defining the plurality of mounting holes and the step of defining the plurality of mounting arcuate slots includes defining the plurality of holes and defining the plurality of arcuate slots on opposite sides of the upper end of the column in the walls and the beam, in the pair of spaced apart sidewalls, respectively.

* * * * *